March 5, 1946.  P. REITZER  2,396,202
COMPASS
Filed June 18, 1943
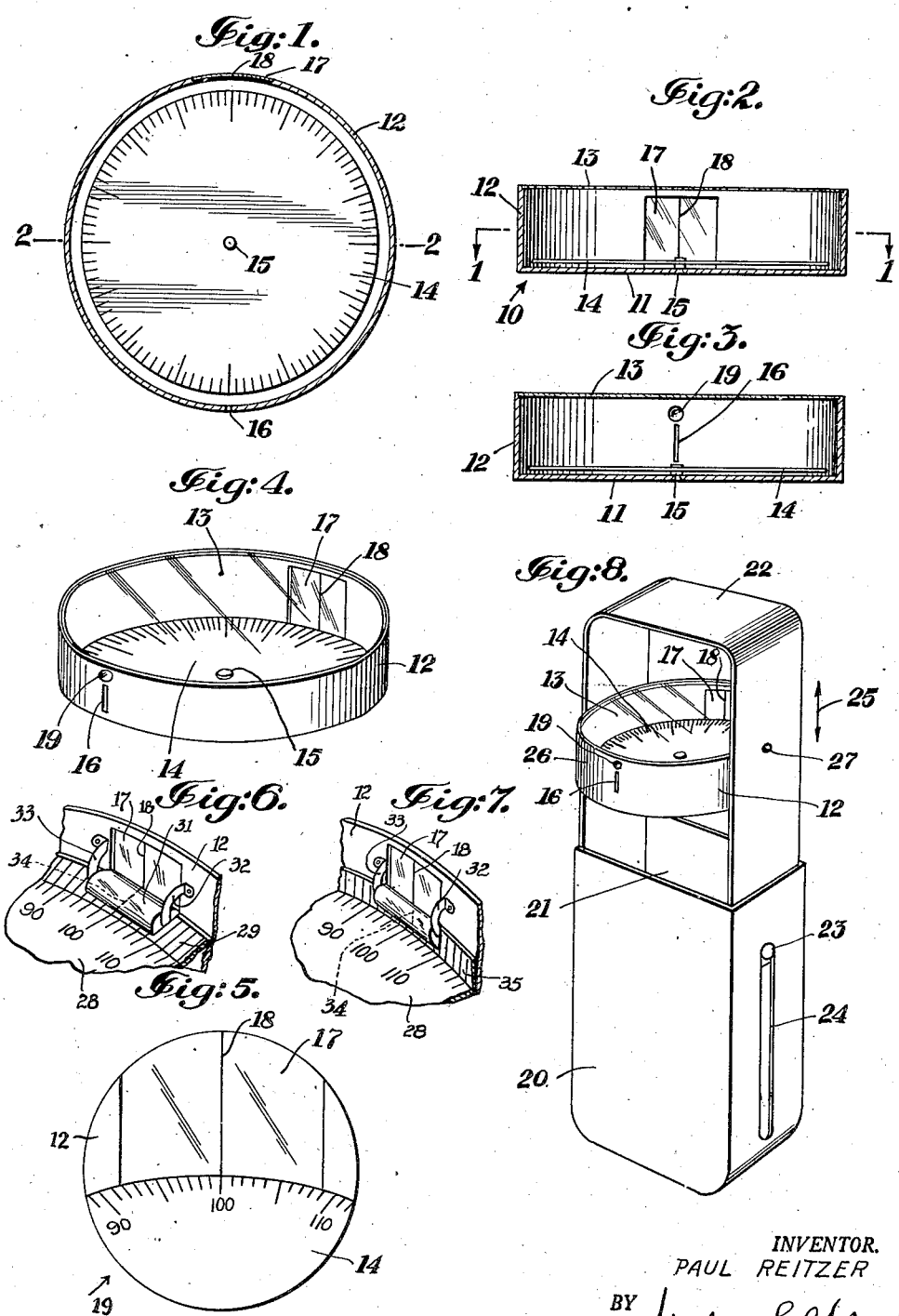
INVENTOR.
PAUL REITZER Patented Mar. 5, 1946

2,396,202

UNITED STATES PATENT OFFICE 2,396,202

COMPASS

Paul Reitzer, Hoffman, N. C.

Application June 18, 1943, Serial No. 491,297

2 Claims. (Cl. 33—222)

My present invention relates to compasses and more particularly compasses provided with magnifying reading lenses.

It is an object of my present invention to increase the accuracy of the reading of such compasses.

It is a further object of my invention to facilitate sighting with a compass and reading of the bearings of the object the position of which has to be determined.

It is still a further object of my invention to provide a compass construction by which the observer's eye is permitted a higher degree of rest than with a compass of usual type.

Another object of my present invention is a compass constructed in such a manner that the observer's view does not pass the glass plate on top of the compass casing and is thus not interfered with by its glare.

It is still another object of my present invention to provide a new combined compass and case therefor which combination enables storing of the compass and moving of the compass into operative position in a simple and easy way, whenever required.

With the above objects in view my present invention mainly consists of the arrangement in a compass of a flat compass card or dial and a sighting device arranged directly above this compass card or dial at opposite sides thereof. It is preferable to combine with a sighting device of this type observation means for reading the indications of this compass card or dial and to arrange this observation means directly above this sighting device at one side of the compass card or dial. The compass card or dial arranged in a compass of the type proposed herewith is preferably freely turnable and provided with the necessary compass indications; this card or dial is connected with the compass needle or a part thereof, thus always maintaining its position.

It should be noted that the casing used for my new compass is preferably one of usual type provided with a relatively low circular side wall. Thus, also in case where in the following claims it is not explicitly stated, it is evident that the sighting members are positioned directly above the compass dial.

It should furthermore be stressed that, whenever I have mentioned in the following claims that the sighting members in general or the sighting slit or window are arranged directly above the compass dial, this does not mean that these sighting members might not reach under the plane of this dial; in contrary, in some cases this is of advantage and I explicitly consider such arrangements also as part of my present invention.

It should also be stressed that wherever in the following description and claims I have used the term "side walls" this term is intended to include also one circular side wall surrounding the compass dial. Finally, it should be noted that the term "compass dial" or "compass card" as used in the following description and claims is intended to include also any type of compass needle or other compass indicating means.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawing, in which:

Figure 1 is a plane section through a compass according to the present invention along line 1—1 of Fig. 2;

Figure 2 is a cross section of the compass shown in Fig. 1 along line 2—2 of Fig. 1;

Figure 3 is a cross section of the compass shown in Figs. 1 and 2 along line 2—2 of Fig. 1;

Figure 4 is a perspective view of my new compass;

Figure 5 is that part of the dial and sighting window which is seen during reading of the compass through the reading lens;

Figures 6 and 7 are perspective partial views of modifications of my new compass; and Figure 8 is a perspective view of the new compass shown in Figs. 1 to 5 combined with a case of new design.

Having explained above the main objects and features of my present invention in detail, I will in the following description restrict myself to describing the actual embodiments shown in the drawing. Of course, this does not mean that the present invention is limited to these embodiments.

The preferred compass type shown in the drawing comprises a relatively shallow casing 10 consisting of a bottom 11 and a circular side wall 12. This casing is permanently covered by a glass plate 13 in usual manner.

The freely rotatable compass dial or card 14 is mounted on bottom 11 of casing 10. This is achieved by means of pivot 15 arranged centrally within casing 10.

In accordance with my present invention two sighting members are arranged in the circular side wall 12 at opposite sides of compass dial 14.

One of these sighting members which faces the person taking the bearings of a certain object, consists of a sighting slit 16 clearly shown in Figs. 1, 3, 4 and 8. This sighting slit is arranged as shown in these figures directly above the plane of compass dial 14 normal to the direction of this plane. The other of the sighting members is a sighting window 17 permanently secured in side wall 12 at the other side of dial 14, opposite sighting slit 16. A hair line 18 of conventional type is provided on this sighting window 17, preferably on the inner face thereof.

This sighting hair line 18 extends parallel to sighting slit 16, normal to the plane of compass dial 14. It should be noted that, as shown in the drawing, the sighting window 17 and hair line 18 extend under the plane of dial 14, thereby facilitating reading of the compass in the way described below in detail.

A further part of my new compass is the observation means, i. e., reading lens 19 arranged preferably directly above sighting slit 16 in side wall 12. This reading lens is of usual type and focused on the lower part of sighting window 17 and that part of compass dial 14 which is adjacent to and in front of this window.

With this new compass the bearings of an object are ascertained in the following way: first the object the position of which has to be determined is sighted in the usual way by looking through the sighting slit 16 and sighting window 17 and moving slit 16 and hair line 18 in coincidence with the object. During this procedure the compass is held in horizontal position in such a way that the sighting slit 16 is directly in front of the observer's eye. After the object has been correctly sighted, the compass is moved a small distance downward until the observer's eye is in front of reading lens 19. In this position the observer will see through this reading lens the image shown in Fig. 5, i. e., a part of window 17 with the correctly adjusted hair line 18 coinciding with a scale line on the compass dial 14; this scale line will then be a precise indication for the direction of the object.

In Figures 6 and 7, two modifications of my new compass are shown. The modification shown in Figure 6 is a compass provided with a freely rotatable compass dial 28 provided with a conical slanting dial portion 29; the dial scale is arranged at least partly on this conical slanting dial portion, as shown in Figure 6.

This slanting dial portion 29 partly covers the sighting window 17. A magnifying lens 31 is arranged in front of this slanting dial portion 29 at a certain distance from the same and secured by means of brackets 32 and 33 to the circular side wall 12 of the compass casing 10. It is preferable to provide on this magnifying lens an additional hairline 34 being in alignment with the sighting hairline 18 on sighting window 17 and forming a continuation of the same.

If an arrangement of the type described in the previous paragraph is used, it is possible to omit the reading lens 19 and use the sighting slit 16 for sighting as well as for reading the indications on dial scale 30. This is carried out by first sighting through slit 16 and window 17 and then reading through the same slit and magnifying lens 31 that indication on dial scale 30 which corresponds to the additional hairline 34 on the lens 31. It is evident that in this case this lens 31 has to be focused on the slanting dial portion 29 in order to enable magnified observation of this dial portion through slit 16.

The modification shown in Figure 7 is substantially identical with the one shown in Figure 6. The only difference is that I provide an annular cylindrical dial portion 35 arranged normal to the plane of dial 28 instead of the slanting dial portion 29. This modification still further facilitates reading of the scale indications 30 through slit 16 without any necessity of shifting the observer's eye relative to the compass.

It should be stressed that the freely rotatable dials 28 with slanting conical dial portions 29 or normal cylindrical dial portions 35 might also be used in combination with the embodiment of my compass shown in Figures 1 to 5 without providing the magnifying lens 31 in front of these dial portions.

From the above description it is evident that by arranging the sighting members directly above the plane of the compass dial and by arranging the reading lens directly above that sighting member which faces the person taking the bearings, reading of the compass and ascertainment of the correct position of the object sighted is greatly facilitated and simplified.

As stated above, I might combine with my new compass construction a new type of compass case. Such a combination is shown in Fig. 8 where the compass case is indicated by 20. This compass case 20 is of longitudinal flat shape and provided at one end with an opening 21. A sliding frame 22 which has in the embodiment shown in the drawing the shape of a yoke—which might, however, also be shaped otherwise—is secured to case 20 by rivets 23 slidable in slots 24. It is evident that by moving these rivets 23 in slots 24 it is possible to slide frame 22 in direction of arrow 25 through opening 21 into and out of case 20.

The compass 26 which is preferably of the above defined construction, is turnably mounted by means of pivots 27 on frame 22, as shown in the drawing. When compass 26 is tilted into the plane of frame 22 it might be slid together with this frame into and out of case 20 whenever required. This construction offers good protection to the compass while not in use and furthermore enables use of the compass without actually touching it. It is also evident that—if the compass is properly suspended on frame 22 by pivots 27—it is extremely easy to move it into horizontal position necessary for sighting.

It will be understood that each of the elements described above, or two or more together, may also find a useful application in other types of compasses differing from the types described above.

While I have illustrated and described the invention as embodied in lensatic compasses I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. In combination with a compass of the type described a case into which said compass is fitted, a frame constructed and attached to said case so as to be slidable into and out of said case and means tiltably pivoting said compass to said frame thereby enabling sliding of said compass together with said frame out of said case, tilting of said compass relative to said case, and sliding of the same back into said case, whenever required.

2. In combination with a compass of the type described an elongated flat case into which said compass is fitted, said case having an opening at one end, a frame constructed and attached to said elongated flat case so as to be slidable in longitudinal direction of said case, said frame thus being adapted to slide through said opening in said case into and out of the same, and means tiltably pivoting said compass to said frame thereby enabling sliding of said compass together with said frame through said opening at one end of said case out of said case, tilting of said compass relative to said case, and sliding of the same back into said case, whenever required.

PAUL REITZER.